(12) United States Patent
Fristedt et al.

(10) Patent No.: US 7,134,715 B1
(45) Date of Patent: Nov. 14, 2006

(54) VEHICLE SEAT HEATING ARRANGEMENT

(75) Inventors: Tommy Fristedt, Bottnaryd (SE);
Daniel Josefsson, Falköping (SE);
Manuel Ruggiu, Linger (LU);
Jean-Francois Gallo, Pétange (LU);
Holger Lorenz, Bernkastel-Kues (DE)

(73) Assignees: Kongsberg Automotive AB (SE);
International Electronics & Engineering, Luxembourg (LU)

( * ) Notice: Subject to any disclaimer, the term of this patent is extended or adjusted under 35 U.S.C. 154(b) by 0 days.

(21) Appl. No.: 10/333,427

(22) PCT Filed: Jul. 17, 2000

(86) PCT No.: PCT/SE00/01492

§ 371 (c)(1),
(2), (4) Date: Jun. 30, 2003

(87) PCT Pub. No.: WO02/06083

PCT Pub. Date: Jan. 24, 2002

(51) Int. Cl.
*B60N 2/56* (2006.01)

(52) U.S. Cl. ............................... 297/180.12; 297/217.3

(58) Field of Classification Search ........... 297/180.11, 297/180.12, 217.13; 340/665, 666, 667; 219/202, 217, 494, 497, 499, 501, 505
See application file for complete search history.

(56) References Cited

U.S. PATENT DOCUMENTS 4,813,738 A * 3/1989 Ito ........................ 297/180.12
4,865,379 A * 9/1989 Aoki et al. ............. 297/180.12
5,002,335 A * 3/1991 Bengtsson ............. 297/180.12
5,176,424 A * 1/1993 Tobita et al. ............ 297/284.1
5,663,504 A * 9/1997 Kluft ............................ 73/660
6,073,998 A * 6/2000 Siarkowski et al. ... 297/180.12
6,189,487 B1* 2/2001 Owen et al. ............... 118/28.5

FOREIGN PATENT DOCUMENTS

| DE | 41 10 702 A1 | 10/1992 |
|----|---|---|
| DE | 197 17 273 C1 | 4/1997 |
| DE | 197 24 168 C1 | 8/1998 |
| EP | 0 873 902 A2 | 10/1998 |
| EP | 1 283 005 B1 | 4/2001 |
| WO | WO-95/13204 A1 | 5/1995 |
| WO | WO-98/01059 A1 | 1/1998 |
| WO | WO-98/01798 A1 | 1/1998 |
| WO | WO-98/14345 A2 | 4/1998 |

\* cited by examiner

*Primary Examiner*—Peter R. Brown
(74) *Attorney, Agent, or Firm*—Lerner, David, Littenberg, Krumholz & Mentlik, LLP

(57) ABSTRACT

A vehicle seat having a heating device arranged in connection with the vehicle seat and connected to a control unit which includes a current-feeding apparatus for feeding a current to the heating device. The vehicle seat also includes a temperature sensor connected to the control unit for detecting the temperature at the heating device. The control unit is arranged to feed the current if the measured temperature falls below a pre-determined temperature value. An occupant sensor is also provided for detecting the presence of an occupant or an object in the vehicle seat. The occupant sensor is arranged as a single integral unit together with the heating device in the vehicle seat.

37 Claims, 3 Drawing Sheets

VEHICLE SEAT HEATING ARRANGEMENT

TECHNICAL FIELD

The invention relates to a vehicle seat arrangement comprising a heating device arranged in connection with a vehicle seat and connected to a control unit which comprises current feeding means for feeding a current to the heating device in order to heat it, a temperature sensor connected to said control unit for detecting the temperature at said heating device, the control unit being arranged to to feed said current if said measured temperature falls below a predetermined temperature value.

Furthermore, the invention relates to a method for manufacturing a vehicle seat arrangement.

BACKGROUND OF THE INVENTION

For reasons of comfort and safety, today's vehicles are often provided with electrically heatable vehicle seats. The driver's seat, as well as the other seats in the vehicle, can be so arranged that they can be heated by means of heating elements in the form of electrically conducting wires which can be placed in each seat in the shape of a heating coil. Such a heating element is normally placed in the back-rest and the cushion of each seat when the seat is manufactured.

The heating element is furthermore connected to a current feeding unit which delivers current. In this manner, the heating element can be heated to a suitable temperature.

There is a requirement for each seat to have a carefully adjusted temperature on its surface, i.e. on that surface which is in contact with the person occupying the seat. For this purpose, the temperature of the heating element can be detected by means of a temperature sensor which is arranged in the seat, close to the heating element, and which is connected to a central control unit. Using the temperature sensor and the control unit, the temperature can be detected. The control unit also comprises current feeding circuits by means of which a certain current can be supplied to the heating element during a time period until a certain desired set value for the temperature is reached. The adjustment of this set value can be done either by means of fixed resistances or by means of an adjustable potentiometer which is adjusted by the occupant of the seat in question.

Using the above-mentioned control method, current can be supplied to the heating element until the central control unit indicates (through the use of said temperature sensor) that the set value has been reached. When this happens, the control unit will cut off the power feeding. This will cause the heating element to cool down gradually. When the heating element has cooled so that its temperature again is below the set value, the power feeding will be resumed. The temperature control will continue in this manner as long as the system is operative.

The control of the supply of current to the heating element can be provided in other ways, for example by means of a control unit which is integrated in the vehicle (for example in the form of a control unit which normally is used for controlling the operation of the vehicle's engine or for air condition control of the vehicle's compartment). To this end, such an external control unit can then be adapted so as to communicate with the above-mentioned heater control unit. Arrangements for such communication are previously known from the patent documents WO 98/01798 and WO 98/01059.

Furthermore, in today's vehicles, it is common to use one or several airbags for the protection of the occupants in the vehicle. In this regard, there is a need for detecting the presence or absence of an occupant in a seat which is associated with an airbag. In particular, there is a desire to detect the load acting upon the seat, in order to provide an indication of the presence of an occupant or an object in a seat. The result of such detection can be used for activating or deactivating various functions, for example said airbags. This is due to the fact that an airbag for a passenger in the vehicle can cause severe injuries if it is activated when, for example, a rearwards facing child-seat is positioned in front of an airbag, or when a passenger who is not using a safety-belt leans forward at the moment of activation of the airbag. The result of such detection can be used for activating other functions in a vehicle, in particular for providing headlight adjustments or a seat belt warning.

For this reason, it is previously known to equip a vehicle with a sensor arrangement which is arranged so as to provide an indication of whether an occupant is present in a seat (which in turn is associated with an airbag) or an indication of whether an auxiliary child seat is positioned on the seat. Also, the the orientation of the child seat or the type of child seat being used is preferably determined. In this manner, an airbag protection system in a vehicle can be deactivated if, for example, a child seat is placed on the seat in question. This constitutes an advantage, since the risk for injuries to the person sitting in the child seat due to an activated airbag can be eliminated.

An arrangement for detection of the presence of a person or an object in a vehicle seat is previously known for example from the patent document WO 98/14345. This invention concerns a method for determining several parameters of a seated person. The evaluation of said parameters can include the estimation of the size and/or the weight of said person.

However, various problem may occur if a seat provided with a heating element as mentioned above were also to be equipped with a separate sensor for detecting the presence of an occupant in said vehicle. Firstly, it can be noted that the heating element can only be adhered to a particular section of the surface of the seat cushion where the sensor is not mounted. This allows a relatively limited area for the mounting of the heating element. Furthermore, there is a risk that the occupant sensor surface will come into contact with adhesion glue which is used for the heating element. This may cause prebending of the sensor, which in turn may lead to deterioration of the detection signal from the occupant sensor. Also, such an known arrangement would comprise a large number of components, which would lead to high costs for the seat. Furthermore, such an arrangement would imply a complex and costly assembly of the seat, which would also lead to higher costs. Also, there is a risk that the operation of the two components, i.e. the heating element and the occupant sensor, would be interfered since the components are mounted very close to each other. Also, such an assembly of a heating element and an occupant sensor would imply a risk that the sensor would slide out of position during its lifetime. Finally, such an assembly of a heating element and an occupant sensor would imply a risk that the heating element would interfere with the operation of the occupant sensor, i.e. the sensor may supply erroneous signals if is is heated.

Consquently, there are various problems involved when trying to combine these two components within the same vehicle seat.

SUMMARY OF THE INVENTION

An object of the invention is to provide an improved vehicle seat arrangement by means of which the above-mentioned problems can be solved. This is accomplished by means of an arrangement of the kind initially mentioned, which comprises a sensor for detecting the presence of an occupant or an object in said vehicle seat, said sensor being arranged as an integrated component together with said heating device in the seat.

By means of the invention, several advantages can be accomplished. Firstly, it can be noted that the invention constitutes one single pre-assembled unit which can be easily mounted in a vehicle seat during manufacturing thereof. Furthermore, with a common, integrated unit, its adhesion to the surface of the vehicle seat can be made as large as necessary since the occupant sensor will not need any separate adhesion points. Also, the problem involving a risk that the occupant sensor would slide out of position in relation to the heating element can be eliminated by means of the invention.

The term "occupant presence sensor" (or "sensor") is used in the following to define a device for detecting the presence of an occupant or an object being positioned in a vehicle seat. This sensor can also be used for determining whether, for example, an auxiliary child seat is placed in a particular vehicle seat. Consequently, this sensor is intended to provide a measuring signal which indicates whether said seat is occupied by a person or an object.

BRIEF DESCRIPTION OF THE DRAWINGS

The invention will now be described in more detail for explanatory and in no sense limiting purposes with reference to the following drawings, in which.

PREFERRED EMBODIMENTS

Figure 1:
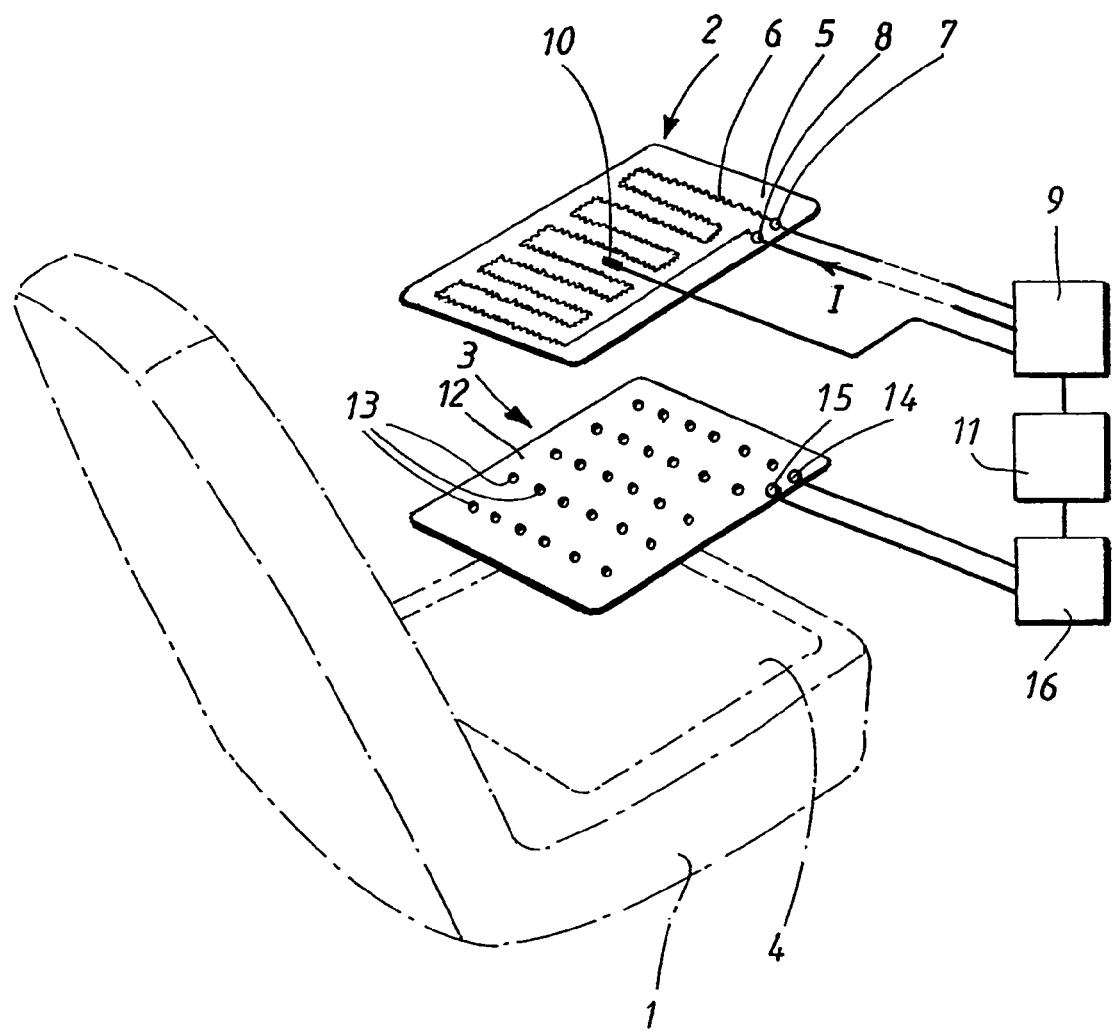
FIG. 1 is a schematic diagram showing an arrangement according to the present invention.

FIG. 1 shows a schematic and slightly simplified circuit diagram of an arrangement according to the present invention. According to the preferred embodiment, the invention is intended for use in connection with an electrically heatable seat 1 in a vehicle.

FIG. 1 shows the main components forming part of the invention, which generally constitutes an integrated heating and occupant presence detection system. According to a preferred embodiment, said arrangement comprises a seat heating device 2 and an occupant presence sensor 3, which in FIG. 1 are shown in a separated manner, but are intended to be assembled and arranged as an integrated component to be placed in a predetermined area 4 in the vehicle seat 1.

It should be noted that the invention is not limited to any particular type of vehicle seats, but can be used in cars, buses, trucks or other types of vehicles in which a heatable seat can be used.

The heating device 2 will now be described in detail. The heating device 2 comprises a carrier layer 5 in the form of a generally thin and flexible sheet of fabric or a similar material. The carrier layer 5 supports a heating element 6 in the form of a electrically conducting wire. The heating element 2 is, as such, of a previously known kind, and forms a heating coil which is defined by the electrical resistance of the conducting wire. Preferably, the wire is woven into the carrier layer 5, according to a layout which is adapted to the heating requirements of the seat 1 in question. However, the heating wire can be mounted in other ways, for example by providing two carrier layers instead of one. In such a case, the heating wire is then placed between these two layers. Alternatively, the heating wire may also be used without any carrier layer.

The heating element 2 is intended to be arranged inside the vehicle seat 1, preferably in its cushion. In principle, the heating element 2 can also be placed in the back-rest of the seat 1. Although the figure shows only one heating element 2, it is possible to connect several such elements to the control unit 1, for example in the form of a separate heating element for the cushion of the seat and a heating element for the backrest of the seat.

The heating element 6 is terminated by two terminals 7, 8 which are intended to be connected to a control unit 9, which is arranged in a suitable place in the vehicle and connected to the terminals 7, 8 via corresponding electrical conductors.

In a manner which is known per se, the control unit 9 is arranged to feed a certain current I through the heating element 5 in order to heat the seat 1. This operation will be described in detail below.

It should be noted that FIG. 1 shows the invention in a slightly simplified form. Consequently, the figure does not show all of the components of the control unit 9, but only those parts which are necessary for the understanding of the invention.

Furthermore, in the vicinity of the heating element 2 there is arranged a temperature sensor 10 which is electrically connected to the control unit 9. The temperature sensor 5 is preferably in the form of a thermistor of the NTC kind ("Negative temperature coefficient"), which has a temperature depending resistance R which corresponds to the temperature T which is present in the vicinity of the heating element 2. Alternatively, a temperature sensor of the PTC kind ("Positive temperature coefficient") temperature sensor can also be used, or any other type of sensor which supplies a signal which is temperature-dependent.

There is furthermore a current source 11 connected to the control unit 9 via a further connection. The current source 11 is preferably constituted by the starting battery of the vehicle. The system furthermore comprises an on/off switch (not shown) which for example is integrated in the ignition lock of the vehicle. The switch is arranged so that the control unit 9 is activated when the switch is closed. The switch can alternatively be constituted by a control function which is provided by the control unit 9. In such case, the switch can be activated for example as a result of a door lock sensor (not shown) indicating that at least one door of the vehicle has been opened. In this manner, the heating of the heating device 2 can be activated before the vehicle is started, preferably even before the seat is occupied.

In the following, the general design and main functions of the control unit 9 will be described. The control unit 9 comprises a logic unit, which preferably is computer based, but which can also consist of previously known electronics circuits. The logic unit is arranged to establish an indication of the temperature T in the seat 1, as detected by means of the temperature sensor 10. This detection preferably utilizes a measuring bridge of the Wheatstone-bridge type (not shown) which is arranged so that the logic unit can calculate a value corresponding to the present temperature T. The detection can alternatively be carried out by means of any other suitable measuring bridge circuit.

Furthermore, the control unit 9 comprises a switch unit (not shown) which feeds the current I through the heating element 2 depending on signals from the above-mentioned logic unit. The switch unit is preferably based on a MOSFET transistor, which is a semi-conductor component which can efficiently deliver large currents from the current source 11 to the heating element 6 and which can also be used so as to control the current between the current source 11 and the heating device 2. Alternatively, the switch unit can be formed in other ways, for example by means of other types of transistors or a relay.

The logic unit of the control unit 9 is thus arranged to determine a value of the current temperature T. If the temperature T is lower than a preset value $T_A$ which corresponds to a certain desired temperature on the surface of the vehicle seat 1, the logic unit will control the above-mentioned switch unit to deliver the current I to the heating element 6. When the set value $T_A$ is reached, the logic unit switches off the feeding of current to the heating element 6 by means of the switch unit.

The invention is not limited to the above-mentioned type of current control in order to regulate the heating. Alternatively, the control of the heating can be based on a regulation of the voltage level of the heating wire.

Furthermore, as mentioned above there is provided an occupant presence sensor 3 which is arranged as an integrated part of the combined heating device and occupant sensor arrangement according to the invention. To this end, the sensor 3 comprises a support element in the form of a carrier layer 12 which is a generelly thin and flexible sheet of a suitable plastics material, preferably PET. However, the invention is not limited to the use of PET, but other materials such as for example PI, PEM or any other suitable material, preferably a plastics material, can also be used.

The carrier layer 12 supports a plurality of force-sensing elements 13 which are positioned as an array or a matrix on the carrier layer 12. Each of the force-sensing elements 13 comprises a force-sensing component or material, in a manner which is known per se. Furthermore, the elements 13 are electrically intereconnected by means of electrical conductors (not shown in FIG. 1) which are terminated by a number of terminals, of which two terminals 14, 15 are indicated in FIG. 1 in a schematical manner. Said terminals 14, 15 are connected to a second control unit 16 via electrical conductors. The second control unit 16, which preferably is powered by the above-mentioned current supply 11, is arranged so as to provide a measurement of the force distribution acting upon the seat 1, by means of the signals from each of the force-sensing elements 13. By comparing the measured force distribution with predetermined force distribution patterns being stored in the second control unit 16, the second control unit 16 can provide an output signal which indicates whether a person or an object is positioned in the seat 1. In the event that an airbag (not shown) is associated with the seat 1, said output signal can be used for example for allowing or preventing the actuation of the airbag. Said output signal can also be used to determine how the occupant or the object is positioned in the seat, for example whether a person is leaning forward or backward in the seat.

The invention is particularly, but not exclusively, intended to be used for detecting the absence or presence of a person with reference to a defined detection area in the seat of a vehicle. The detection can, for example, be utilized in systems the purpose of which is to deactivate an air-bag if a passenger is not present in the detection area. This prevents the air-bag from being triggered unnecessarily or from causing injuries due to the fact that a child seat is placed in the seat of the vehicle, or that the passenger sits in a non-suitable position in the seat of the vehicle. For this purpose, the detection area is suitably chosen to comprise a limited part of the area at the seat 1, so that presence does not only mean that a person is present in the seat, but for presence to be detected the person must also sit essentially reclined in the seat, or at a certain maximal distance from the back-rest. This means that when a child seat is placed in the seat with a child sitting in the seat, absence is detected and a corresponding airbag will not be actuated in the event of a collision.

The occupant presence sensor 3 according to the invention can alternatively be used for actuating the heating device 2. This is particularly advantageous if only a limited amount of electric power is available for the heating device. According to such an embodiment, the two control units 9, 16 as described above are preferably integrated into one single unit. Also, in this case, such a control unit would then be arranged so as to allow actuation of the heating device 2 only when a person is sitting in the seat 1.

Figure 2:
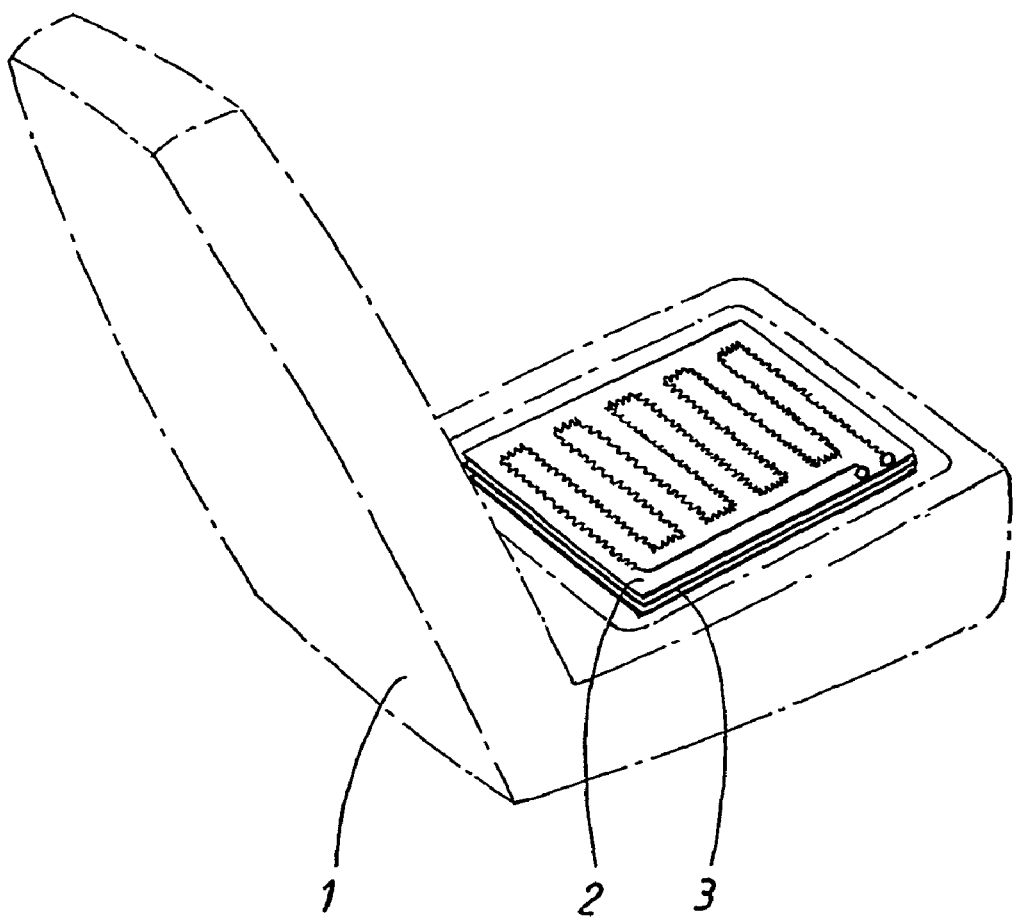
FIG. 2 is a schematic diagram showing an arrangement generally corresponding to FIG. 1 but in an assembled state.

FIG. 2 shows a perspective view corresponding to that of FIG. 1, but with the heating device 2 and the occupant presence sensor 3 arranged in their assembled state. The invention relies on the fact that the heating device 2 and the occupant presence sensor 3 are arranged as two components which are assembled in a laminated manner, so as to form an integrated unit. For this reason, the occupant presence sensor 3 is not fully visible in FIG. 2, since the heating device 2 is positioned above said sensor 3. In particular, these components are preferably prefabricated or pre-assembled so as to form one single unit which is intended to be mounted in a vehicle seat during manufacturing of the seat.

According to the preferred embodiment of the invention, the heating device 2 and the occupant presence sensor 3 are assembled by means of gluing or ironing. More precisely, the heating device 2 may then comprise one or two carrier layers which are provided with glue. These layers are laminated either by using only one carrier layer, on the upper side of the sensor, or with two carrier layers, i.e. one on each side of the sensor. When using two carrier layers, both of them can have glue, or only the carrier layer with the heating wire can be provided with glue.

Furthermore, a protective layer can be placed between the occupant sensor and the heating wire, i.e. inside the complete sandwich component. Such a protective layer can be manufactured from a suitable foam, felt or fabric material.

Furthermore, the heating wire 6 can in principle also be arranged directly on the occupant sensor surface (i.e. the surface of the sensor carrier layer 12), for example by gluing it directly on said surface.

The two control units 9, 16 (see also FIG. 1) can preferably be combined in a common housing with or without a common logic unit. In this manner, the heating control components using the detection of the temperature and the signal from the occupant presence sensor 3 will then be accommodated in one single unit. This combined unit can furthermore be provided with a common communication system which then may communicate with an external computer system in the vehicle.

Any one of the two control units 9, 16, or the above-mentioned single (i.e. combined) control unit, can be placed on the heating device 2 or the occupant sensor 3. Preferably, such a control unit is then preferably crimped on the carrier layer 12 of occupant sensor.

Furthermore, the temperature sensor 10 can be placed on the heating device 2, as mentioned above. Alternatively, the temperature sensor 10 can be placed on the surface of the occupant sensor 3 (i.e. on the surface of its carrier layer 12) and the signal from the temperature sensor 10 can be used to control the heating element, as mentioned above.

More than one temperature sensor can be used. By placing several temperature sensors along the surface of the occupant sensor carrier 12, temperature signals from various areas of the vehicle seat surface can can be used to improve the operation of the occupant sensor. For example, by using the temperature in occupant sensor function, differences in the stiffness of the vehicle seat foam can be compensated for. In this manner, a more accurate signal can be obtained.

Furthermore, the heating element 2 can be operated so as to heat the pressure points 13 of the occupant sensor 3. Preferably, the seat is heated slightly (i.e. above approximately 10° C.).

According to a particular embodiment of the invention, the heating of the heating device 2, i.e. the supply of heating current to the heating wire 6, is preferably synchronized with the measurement cycles of the occupant sensor 3, i.e. it is synchronized with the occasions at which measurement signals are supplied from said sensor 3. This means that, for example, the heating device 2 can be controlled so that it is switched off just before each point in time at which a measurement signal is being fed from the occupant sensor 3. By switching off the heating device 2, the heating wire 6 is allowed to cool down. This leads to a situation in which the occupant sensor 3 is given an essentially uniform temperature at every occasion when measurement signals are supplied from the occupant sensor 3. In this manner, any risk of interference from the heating device 2 during measurements with the occupant sensor 3 can be eliminated, which is an additional advantage with the present invention.

Figure 3:
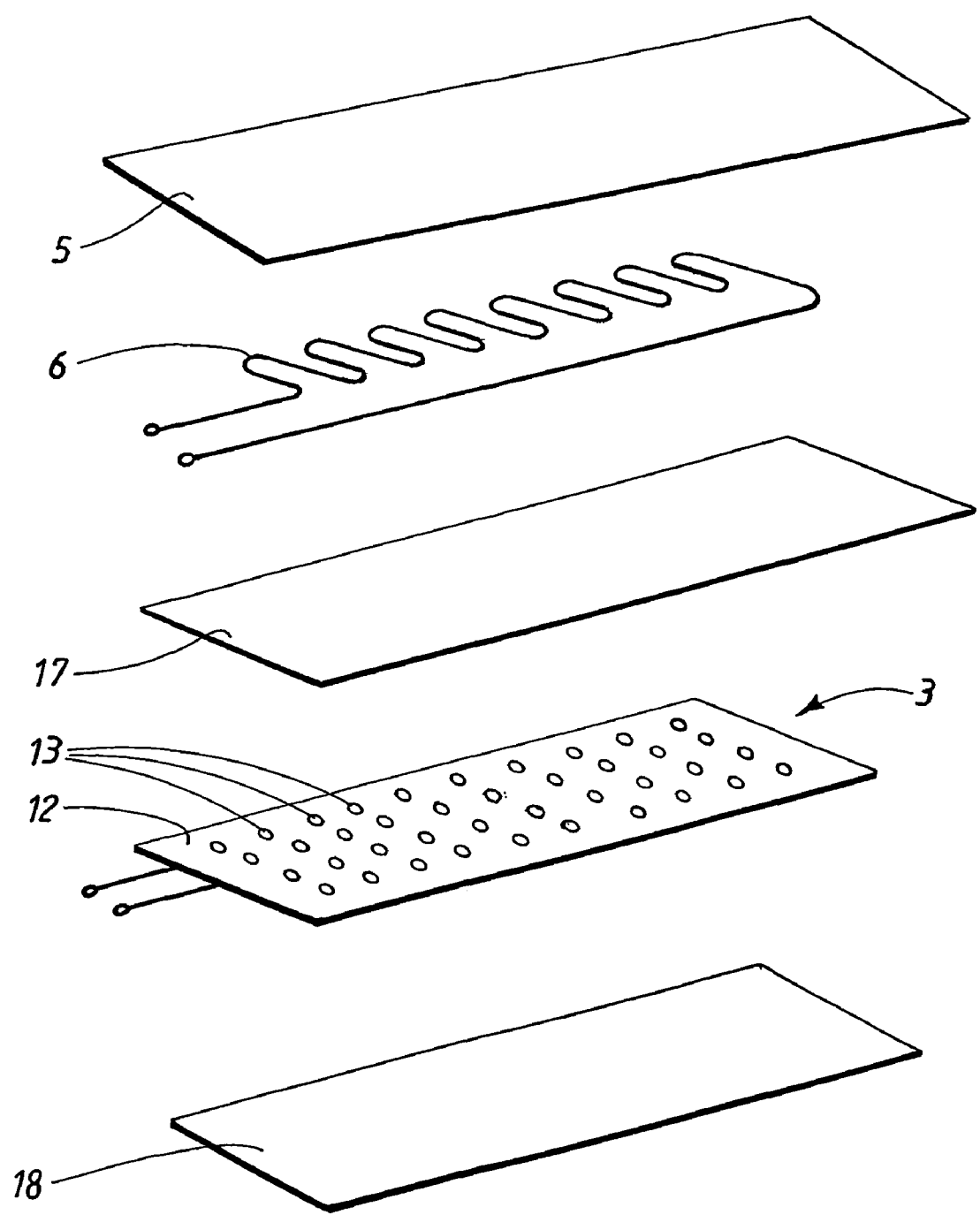
FIG. 3 is a perspective view of an integrated arrangement according to the invention.

FIG. 3 shows in a schematical form the design of the integrated heating element and occupant sensor according to the invention. In this regard, FIG. 3 shows the various layers and components which can be used according to a preferred embodiment. In particular, the combined arrangement according to the invention comprises a first layer 5 or carrier layer which corresponds to the carrier layer described above and shown in FIG. 1. A heating wire 6 is mounted on the underside of said first layer 5 in a suitable manner, for example by weaving it into the first layer 5 or by gluing it onto the first layer 5.

The mounting of the heating wire 6 can be accomplished through the use of a second layer 17. In this manner, the heating layer 6 will be arranged between the first layer 5 and the second layer 17. In this case, no glue is necessary on the heating wire 6. Instead the two layers 5, 17 can be glued together (the heating wire 6 then being positioned inbetween) by providing glue on the underside of the first layer 5 (and/or by providing glue on the top side of the second layer 17).

An advantage with the second layer 17 is that it constitutes a protective layer which is arranged between the heating wire 6 and the occupant presence sensor 3 (cf. FIG. 1). In this manner, the heating wire 6 is protected from direct contact with the pressure-sensing elements 13 on the occupant presence sensor 3.

As an additional protection, a third layer 18 can be provided under the sensor carrier layer 12. However, this is not necessary in all applications.

When manufacturing the arrangement according to the invention, all the suitable layers (if any) are combined with the heating wire 6 and the presence sensor 3 into an integrated, laminated assembly which subsequently can be mounted in a vehicle seat as a single unit during manufacturing thereof.

The invention is not limited to the embodiments described above but may be varied within the scope of the appended patent claims. For example, the invention can be arranged in various ways, for example with or without each one of the three layers 5, 17, 18. Furthermore, the occupant sensor can be in the form of a pressure sensor operating either directly with pressure (compressing the sensing area) or with bending (bending the sensing area). Other types of sensors are also possible, for example capacitive sensors, which are used so as to detect the influence of a human being on electrical fields in the vehicle.

Also, as opposed to what is shown in FIG. 1, in which the heating device 2 is arranged on top of the occupant presence sensor 3, the invention can alternatively be accomplished by arranging the occupant presence sensor 3 on top of the heating device 2.

Furthermore, the invention can be implemented with or without the protective layers 17, 18 shown in FIG. 3. Also, the heating wire can be arranged underneath or on top of the carrier layer 5 shown in FIG. 1. Also, it is possible to use a layer of the heating device to support occupant sensing elements such as the sensing elements 13 described above.

The invention claimed is:

1. A vehicle seat comprising:
    a heating device arranged in connection with a vehicle seat and connected to a control unit, said control unit including current feeding means for feeding a current to said heating device;
    a temperature sensor connected to said control unit, said temperature sensor adapted for detecting a temperature at said heating device, said control unit being operative to feed said current if a detected temperature falls below a predetermined temperature value; and
    an occupant sensor for detecting the presence of an occupant or an object in said vehicle seat, said occupant sensor being arranged as an integrated component together with said heating device in said vehicle seat, wherein said occupant sensor and said heating device are formed as two laminated sheet layers.

2. The vehicle seat according to claim 1, wherein said heating device and said occupant sensor are prefabricated as one single integrated unit adapted to be mounted in said vehicle seat.

3. The vehicle seat according to claim 1, further comprising a protection material disposed between said occupant sensor and said heating device.

4. The vehicle seat according to claim 1, wherein said heating device includes a carrier layer and a heating wire, said heating wire being arranged on said carrier layer.

5. The vehicle seat according to claim 1, wherein said heating device includes two carrier layers and a heating wire, said heating wire being arranged between said two carrier layers.

6. The vehicle seat according to claim 1, wherein said occupant sensor includes a carrier layer and a plurality of pressure-sensing elements, said pressure-sensing elements being arranged on said carrier layer.

7. The vehicle seat according to claim 6, wherein said heating device includes a heating wire, wherein said carrier layer supports said heating wire and forms part of said heating device.

8. The vehicle seat according to claim 7, wherein said carrier layer is made of a plastic material.

9. The vehicle seat according to claim 7, wherein said control unit is arranged on said occupant sensor.

10. The vehicle seat according to claim 6, wherein said carrier layer is made of a plastic material.

11. The vehicle seat according to claim 6, wherein said control unit is arranged on said occupant sensor.

12. The vehicle seat according to claim 1, wherein said control unit for said heating device also comprises control unit for said occupant sensor.

13. The vehicle seat according to claim 1, wherein said temperature sensor is used for the control of the operation of said occupant sensor.

14. The vehicle seat according to claim 1, wherein said heating device is operative so as to provide heat in response to a signal from said occupant sensor.

15. The vehicle seat according to claim 1, wherein said occupant signal outputs a signal upon detecting the presence of an occupant or an object in said vehicle seat, wherein said control unit is adapted to switch said heating device on and off in a synchronized manner with respect to the occasions at which said signal is outputted from said occupant sensor.

16. A method for manufacturing a vehicle seat, comprising the steps of:
    providing a heating device;
    providing an occupant sensor for detecting the presence of an occupant or an object in a vehicle seat; and
    providing a temperature sensor adapted to be connected to a control unit, said control unit adapted for detecting a temperature at said heating device, said control unit being operative to feed a current to said heating device if a detected temperature falls below a predetermined temperature value;
    wherein said heating device and said occupant sensor are provided as an integrated component and formed as two laminated sheet layers.

17. The method according to claim 16 wherein said control unit is mounted on said occupant sensor.

18. The method according to claim 16, further comprising providing a protection material between said occupant sensor and said heating device.

19. The method according to claim 18, wherein said control unit is mounted on said occupant sensor.

20. A vehicle seat comprising:
    a heating device arranged in connection with a vehicle seat and connected to a control unit, said control unit including current feeding means for feeding a current to said heating device;
    a temperature sensor connected to said control unit, said temperature sensor adapted for detecting a temperature at said heating device, said control unit being operative to feed said current if a measured temperature falls below a predetermined temperature value; and
    an occupant sensor for detecting the presence of an occupant or an object in said vehicle seat, wherein said occupant sensor and said heating device are assembled so as to form a single integral unit, such that said occupant sensor and said heating device are attached to one another.

21. The vehicle seat according to claim 20, wherein said occupant sensor and said heating device are assembled to one another with glue.

22. The vehicle seat according to claim 20, further comprising a protection material disposed between said occupant sensor and said heating device.

23. The vehicle seat according to claim 20, wherein said heating device includes a carrier layer and a heating wire, said heating wire being arranged on said carrier layer.

24. The vehicle seat according to claim 20, wherein said occupant sensor includes a carrier layer and a plurality of pressure-sensing elements, said pressure-sensing elements being arranged on said carrier layer.

25. The vehicle seat according to claim 20, wherein said control unit for said heating device is also comprises a control unit for said occupant sensor.

26. The vehicle seat according to claim 20, wherein said heating device is operative so as to provide heat in response to a signal from said occupant sensor.

27. The vehicle seat according to claim 20, wherein said occupant sensor outputs a signal upon the presence of an occupant or an object in said vehicle seat, wherein said control unit is adapted to switch said heating device on and off in a synchronized manner with respect to the occasions at which said signal is outputted from said occupant sensor.

28. A method of manufacturing a vehicle seat, comprising the steps of:
    providing a heating device,
    providing an occupant sensor for detecting the presence of an occupant or an object in a vehicle seat;
    providing a temperature sensor, said temperature sensor being adapted to be connected to a control unit, said control unit adapted for detecting a temperature at said heating device, said control unit being operative to feed a current to said heating device if a detected temperature falls below a predetermined temperature value; and
    assembling said heating device and said occupant sensor in the form of a single integral unit such that said heating device and said occupant sensor are attached to one another.

29. The method of manufacturing a vehicle seat according to claim 28, wherein said occupant sensor and said heating device are attached to one another with glue.

30. The method of manufacturing a vehicle seat according to claim 28, further comprising providing a protection material between said occupant sensor and said heating device.

31. A vehicle seat comprising:
    a heating device arranged in connection with a vehicle seat and connected to a control unit, said control unit including current feeding means for feeding a current to said heating device;
    a temperature sensor connected to said control unit, said temperature sensor adapted for detecting a temperature at said heating device, said control unit being operative to feed said current if a measured temperature falls below a predetermined temperature value; and
    an occupant sensor for detecting the presence of an occupant or an object in said vehicle seat, wherein said occupant sensor and said heating device are assembled so as to form a single integral unit, such that said occupant sensor and said heating device are attached to one another;
    wherein said occupant sensor includes a carrier layer and a plurality of pressure-sensing elements, said pressure-sensing elements being arranged on said carrier layer.

32. The vehicle seat according to claim 31, further comprising a protection material disposed between said occupant sensor and said heating device.

33. The vehicle seat according to claim 31, wherein said heating device includes a carrier layer and a heating wire, said heating wire being arranged on said carrier layer.

34. The vehicle seat according to claim 31, wherein said heating device includes two carrier layers and a heating wire, said heating wire being arranged between said two carrier layers.

35. The vehicle seat according to claim 31, wherein said control unit for said heating device is also comprises a control unit for said occupant sensor.

36. The vehicle seat according to claim 31, wherein said heating device is operative so as to provide heat in response to a signal from said occupant sensor.

37. The vehicle seat according to claim 31, wherein said occupant sensor outputs a signal upon the presence of an occupant or an object in said vehicle seat, wherein said control unit is adapted to switch said heating device on and off in a synchronized manner with respect to the occasions at which said signal is outputted from said occupant sensor.

* * * * *

UNITED STATES PATENT AND TRADEMARK OFFICE
CERTIFICATE OF CORRECTION

| | | |
|---|---|---|
| PATENT NO. | : 7,134,715 B2 | Page 1 of 1 |
| APPLICATION NO. | : 10/333427 | |
| DATED | : November 14, 2006 | |
| INVENTOR(S) | : Tommy Fristedt et al. | |

It is certified that error appears in the above-identified patent and that said Letters Patent is hereby corrected as shown below:

Column 1, line 11, delete "to" (second occurrence).
Column 2, line 22, delete "the" (second occurrence).
Column 2, line 31, after "known" insert --,--.
Column 2, line 32, after "example" insert --,--.
Column 2, line 37, "problem" should read --problems--.
Column 2, line 38, delete "were" and insert therefor --was--.
Column 2, line 50, delete "an" and insert therefor --a--.
Column 2, line 56, after "interfered" insert --with--.
Column 2, line 63, delete "is" (first occurrence) and insert therefor --it--.
Column 3, line 67, delete "a" and insert therefor --an--.
Column 4, line 48, after "which" insert --,--.
Column 4, line 48, after "example" insert --,--.
Column 4, line 53, after "activated" insert --,--.
Column 4, line 53, after "example" insert --,--.
Column 5, line 35, after "as" insert --,--.
Column 5, line 35, after "example" insert --,--.
Column 5, line 57, after "used" insert --,--.
Column 5, line 58, after "example" insert --,--.
Column 5, line 61, after "example" insert --,--.
Column 7, line 10, delete "can" (second occurrence).
Column 9, line 8, after "comprises" insert --said--.
Column 10, line 6, delete "is".
Column 11, line 4, delete "is".

Signed and Sealed this

Sixth Day of March, 2007

JON W. DUDAS
*Director of the United States Patent and Trademark Office*